United States Patent [19]
Liesener

[11] Patent Number: 5,682,791
[45] Date of Patent: Nov. 4, 1997

[54] INDEPENDENT LATCHING SYSTEM FOR A TRANSMISSION

[75] Inventor: Kenneth P. Liesener, Peoria, Ill.

[73] Assignee: Caterpillar Inc., Peoria, Ill.

[21] Appl. No.: 670,836

[22] Filed: Jun. 28, 1996

[51] Int. Cl.⁶ .................................................. F16H 61/12
[52] U.S. Cl. ................................................ 74/335; 477/906
[58] Field of Search .............................. 74/335; 477/906

[56] References Cited

U.S. PATENT DOCUMENTS

| | | | |
|---|---|---|---|
| 4,827,806 | 5/1989 | Long et al. | 74/869 |
| 4,838,298 | 6/1989 | Cleasby | 137/110 |
| 5,063,813 | 11/1991 | Lentz | 74/866 |
| 5,138,838 | 8/1992 | Crosser | 60/433 |
| 5,199,313 | 4/1993 | Muller | 74/335 |
| 5,222,581 | 6/1993 | Paulsen | 192/3.58 |
| 5,438,887 | 8/1995 | Simmons | 74/335 |
| 5,445,043 | 8/1995 | Eaton et al. | 74/335 |
| 5,528,949 | 6/1996 | Stainton et al. | 74/335 |

FOREIGN PATENT DOCUMENTS 2 258 278  2/1993  United Kingdom .

*Primary Examiner*—Dirk Wright
*Attorney, Agent, or Firm*—J. W. Burrows

[57] ABSTRACT

In machines such as hauling units having electro-hydraulic transmission controls, it is desirable to ensure that in the event of an electrical malfunction or power failure the transmission remains in the gear that it was in when the electrical malfunction occurred. In the subject invention, an independent latching system is provided in a transmission which in the event of an electrical malfunction automatically latches the transmission in the existing gear. This is accomplished by providing a master latch valve mechanism and a latching shuttle valve to act in cooperation with an electrically controlled proportional valve and a proportional valve that controls engagement of a plurality of hydraulically actuated clutches. When the transmission is operating normally, the master latch valve mechanism directs pressurized fluid from a source of pressurized fluid to urge the latching shuttle valve to an open position. Upon an electrical malfunction, the master latch valve mechanism vents the fluid from the latching shuttle valve thus allowing the latching shuttle valve to block the flow thereacross which forces the proportional valves to hold the actuated clutches in their fully engaged positions.

8 Claims, 4 Drawing Sheets

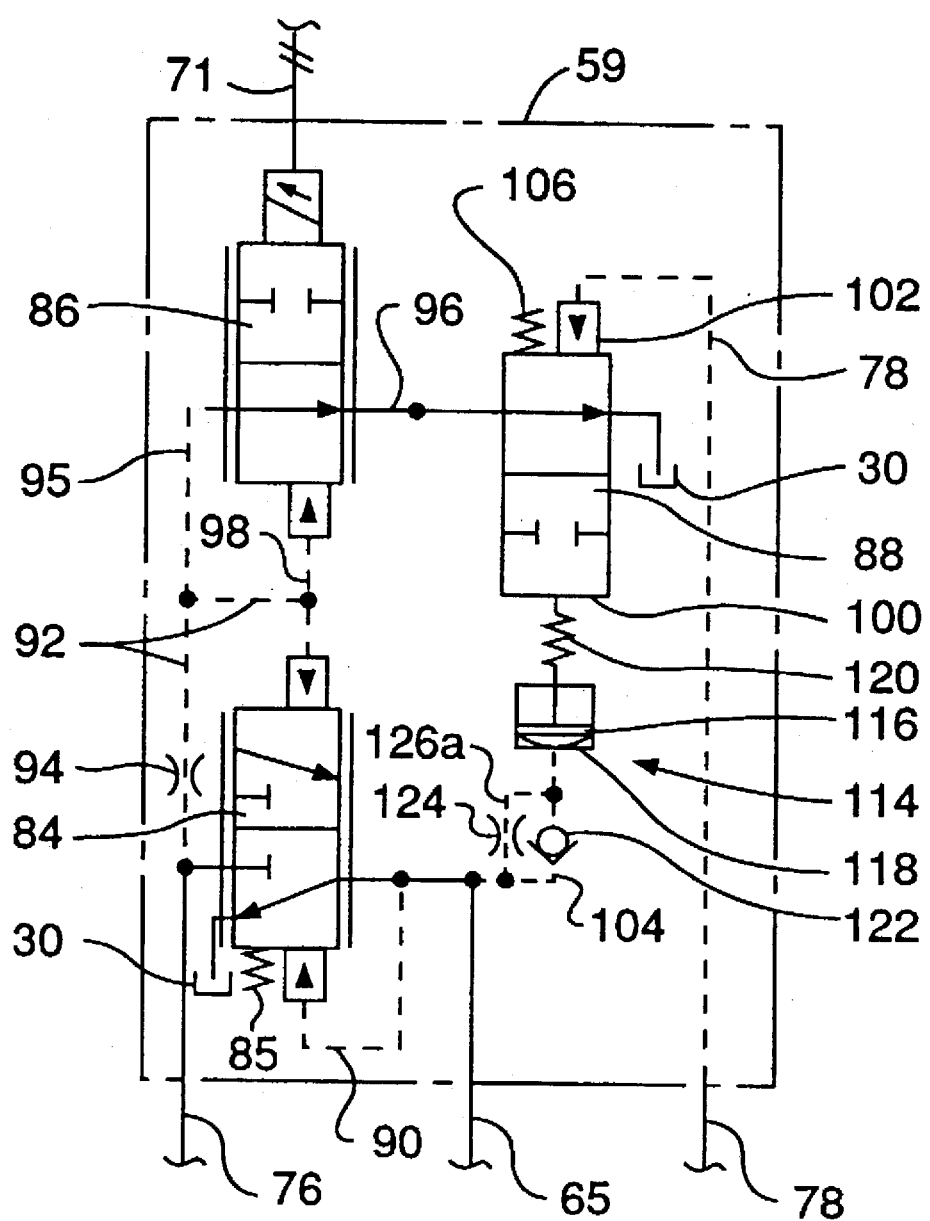

5,682,791

INDEPENDENT LATCHING SYSTEM FOR A TRANSMISSION

TECHNICAL FIELD

This invention relates generally to a control system for use in a transmission having hydraulically actuated clutches and more particularly to an independent latching system to latch specific ones of the hydraulically actuated clutches in their engaged positions in an event of an electrical malfunction.

BACKGROUND ART

In some machines used today, it is beneficial to keep the transmission in a predetermined gear in the event of an electrical malfunction or power failure. At least one hydraulic arrangement is known at which a source of pressurized fluid is latched and unlatched at different pressure levels. It is well known to proportionally control the engagement of hydraulically actuated clutches by directing an electrical signal from a microprocessor to an electro-hydraulic proportional valve. Various other arrangements are known which use hydraulic valves in combination with electrically controlled solenoids to maintain fluid actuators in their engaged position in the event of an electrical system failure. Many of these known arrangements are complicated and use many different components and/or specialized components. It is desirable to provide an independent latching system that is simple in construction and effective to maintain a machine in gear in the event there is an electrical malfunction or failure in the system.

The present invention is directed to overcoming one or more of the problems as set forth above.

DISCLOSURE OF THE INVENTION

In one aspect of the present invention, an independent latching system is provided and adapted for use in a control system for a transmission having hydraulically actuated clutches. The control system includes a source of pressurized fluid connected to a reservoir and an electronic controller connected to a source of electrical energy. The electronic controller is operative to receive signals from various system parameters and to direct control signals therefrom. The electronic controller is operative in response to a command input mechanism to selectively control engagement of respective ones of the hydraulically actuated clutches in the transmission. The independent latching system includes a plurality of electro-hydraulic valve mechanisms connected to the electronic controller and to respective ones of the hydraulically actuated clutches. Each of the electro-hydraulic valve mechanisms is operative in response to receipt of a signal from the electronic controller to proportionally control engagement of the respective hydraulically actuated clutches. Each of the electro-hydraulic valve mechanisms includes a proportional valve connected between the source of pressurized fluid and the respective hydraulically actuated clutches, an electrically controlled proportional valve operatively connected to the electronic controller and the proportional valve, and a latching shuttle valve having opposed ends with one of the opposed ends connected to the respective hydraulically actuated clutch. Each of the latching shuttle valves is disposed between the respective electrically controlled proportional valve and the reservoir. The latching shuttle valve is movable in response to a force differential between its opposed ends. The independent latching system also includes a master latch valve mechanism connected between the source of pressurized fluid and the other opposed end of the latching shuttle valve.

BRIEF DESCRIPTION OF THE DRAWINGS

FIG. 5 is schematic representation of an alternate embodiment of the embodiment illustrated in FIG. 4.

BEST MODE FOR CARRYING OUT THE INVENTION

Figure 1:
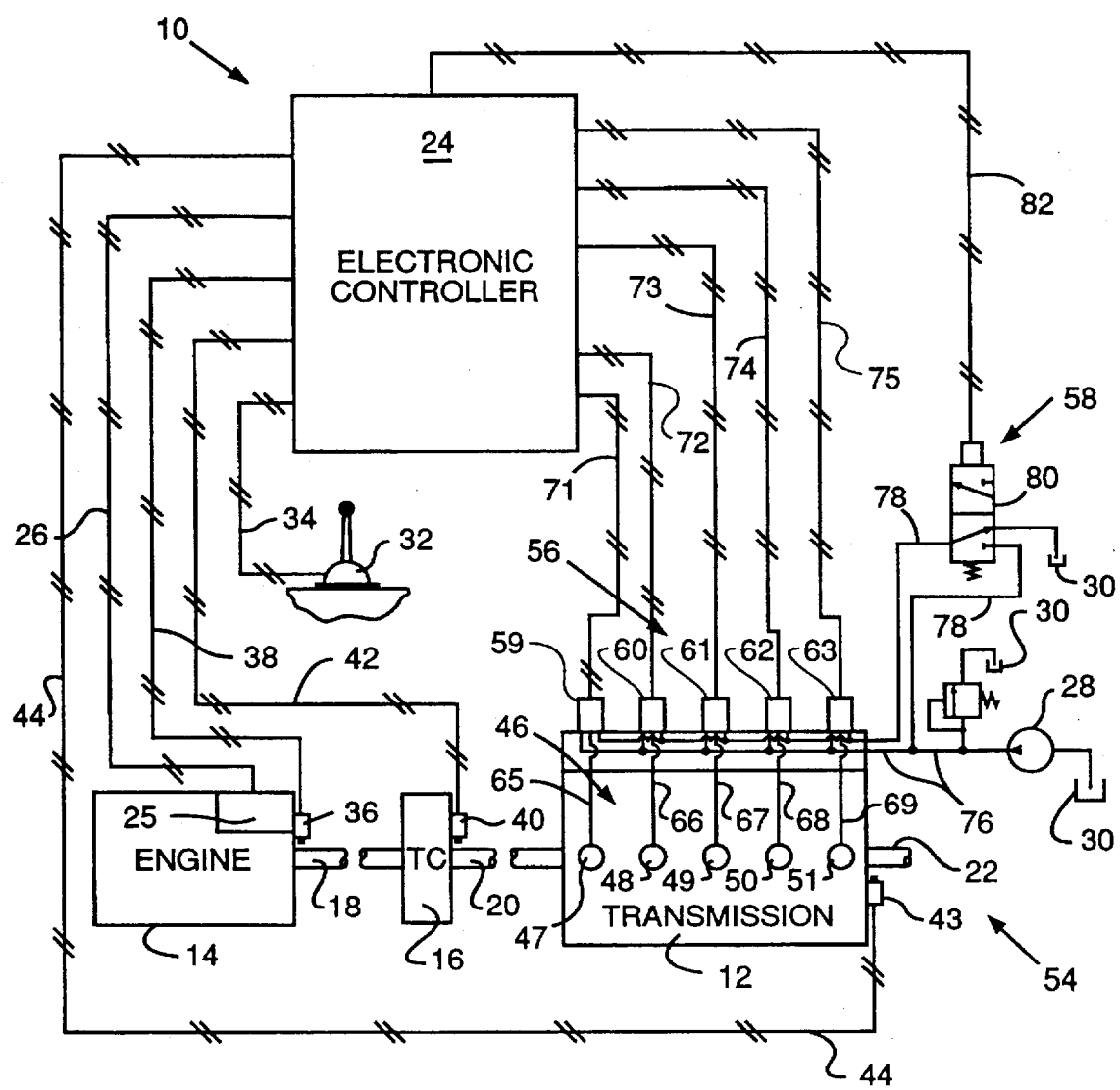
FIG. 1 is a partial diagrammatic and partial schematic representation of a control system for a transmission incorporating an embodiment of the present invention.

Referring to the drawings, and more specifically to FIG. 1, a control system 10 for a transmission 12 is illustrated for use in a machine (not shown) having an engine 14 drivingly connected to a torque converter 16 by a shaft 18 and another shaft 20 drivingly connected between the torque converter 16 and the transmission 12. Output power from the transmission 12 is transmitted therefrom by an output shaft 22.

The control system 10 includes an electronic controller 24, a source of electrical energy 25 connected to the electronic controller 24 by an electrical connection 26, a source of pressurized fluid 28 which receives fluid from a reservoir 30, and a command input mechanism 32 connected to the electronic controller 24 by an electrical connection 34. A speed sensor 36 is connected to the electronic controller 24 by an electrical connection 38 and is operative to sense the rotational speed of the shaft 18. A speed sensor 40 is connected to the electronic controller 24 by an electrical connection 42 and is operative to sense the rotational speed of the shaft 20. A speed sensor 43 is connected to the electronic controller 24 by an electrical connection 44 and is operative to sense the rotational speed of the shaft 22.

The transmission 12 has a plurality of hydraulically actuated clutches 46. In the subject arrangement, the plurality of hydraulically actuated clutches 46 includes first, second, third, fourth, and fifth hydraulically actuated clutches 47,48,49,50,51.

An independent latching system 54 is provided and includes a plurality of electro-hydraulic valve mechanisms 56 and a master latch valve mechanism 58. The plurality of electro-hydraulic valve mechanisms 56 includes first, second, third, fourth, and fifth electro-hydraulic valve mechanisms 59,60,61,62,63 each respectively connected to respective ones of the hydraulically actuated clutches 47,48, 49,50,51 by respective conduits 65,66,67,68,69. The electronic controller 24 generates electrical control signals representative of the desired input from the command input mechanism 32 and delivers the electrical control signals through respective electrical connections 71,72,73,74,75 to the respective first, second, third, fourth, and fifth electro-hydraulic valve mechanisms 59,60,61,62,63.

A conduit 76 connects each of the plurality of electro-hydraulic valve mechanisms 56 with the source of pressurized fluid 28. The master latch valve 58 is disposed in a conduit 78 between the source of pressurized fluid 28 and each of the plurality of electro-hydraulic valve mechanisms 56.

The master latch valve mechanism 58 is a two position valve 80 that is spring biased to its first position and movable to its second position in response to receipt of an electrical signal from the electronic controller 24 through an electrical connection 82. In the first position of the two position valve 80, each of the plurality of electro-hydraulic valve mechanisms 56 is in communication with the reservoir 30 and in the second position thereof, the source of pressurized fluid 28 is in communication therethrough with each of the plurality of electro-hydraulic valve mechanisms 56.

Figure 2:
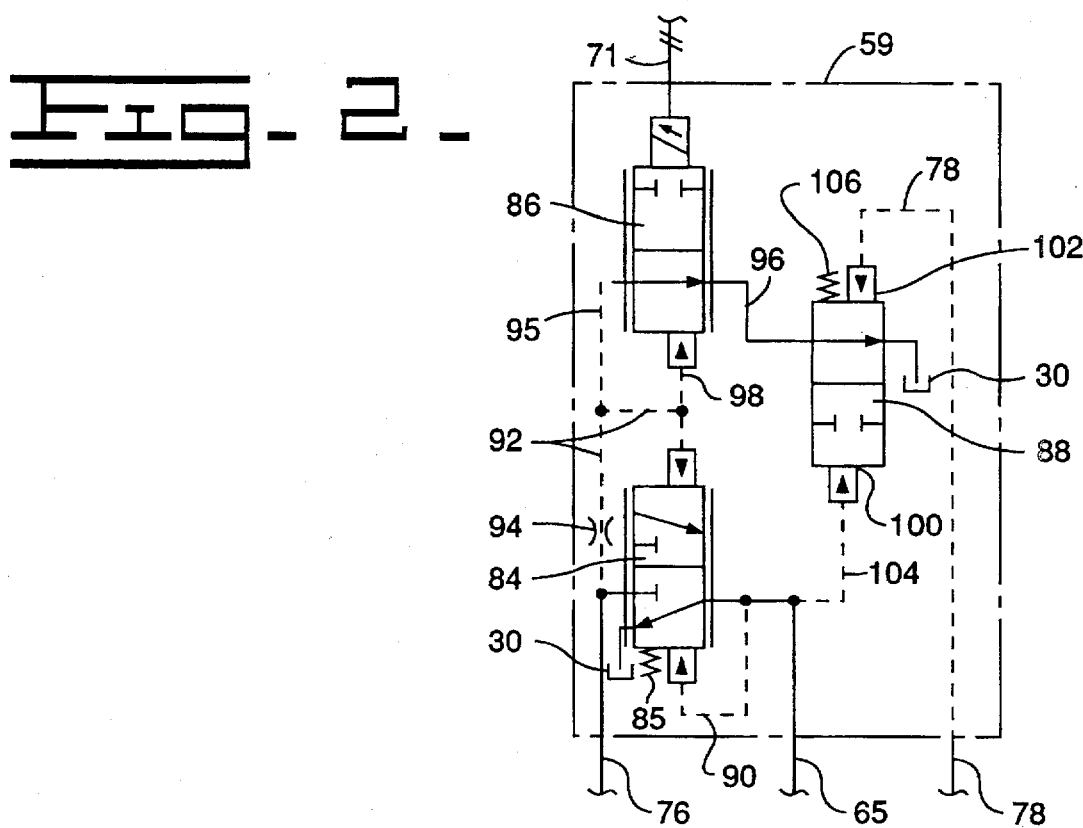
FIG. 2 is a schematic representation of a portion of FIG. 1 that more explicitly illustrates a portion of the present invention.

Referring to FIG. 2, one electro-hydraulic valve mechanism 59 of the plurality of electro-hydraulic valve mechanisms 56 is illustrated in greater in detail. Since all of the plurality of electro-hydraulic valve mechanisms 56 are the same, only the one electro-hydraulic valve mechanism 59 and its associated hydraulically actuated clutch 47 will be described in detail. The one electro-hydraulic valve mechanism 59 includes a proportional valve 84 operatively connected between the source of pressurized fluid 28 and the hydraulically actuated clutch 47 by the conduits 76,65, an electrically controlled proportional valve 86 operatively connected to the electronic controller 24 and the proportional valve 84, and a latching shuttle valve 88 disposed between the electrically controlled proportional valve 86 and the reservoir 30. The proportional valve 84 is an infinitely variable two position valve that is spring biased by a spring 85 towards a first position at which the flow of fluid from the source of pressurized fluid 28 is blocked and the hydraulically actuated clutch 47 is in communication with the reservoir 30 and movable towards a second position at which the source of pressurized fluid 28 is in communication with the hydraulically actuated clutch 47 through the conduits 76,65. A pilot conduit 90 connects the conduit 65 to one end of the proportional valve 84 which acts in conjunction with the spring 85 to urge the proportional valve 84 towards its first position. A pilot conduit 92 having a flow restricting orifice 94 therein connects the pressurized fluid in the conduit 76 to the other end of the proportional valve 84 to urge it towards its second position.

The electrically controlled proportional valve 86 is disposed between the pilot conduit 92 of the proportional valve 84 and the latching shuttle valve 88 by respective pilot conduits 95,96. The electrical connection 71 connects one end of the electrically controlled proportional valve 86 to the electronic controller 24 and a conduit 98 connects the other end thereof to the other end of the proportional valve 84 through the conduit 92. The electrically controlled proportional valve 86 is an infinitely variable two position valve 45 proportionally movable towards its first position in response to pressurized fluid in the conduit 92 and proportionally movable towards its second position in response to receipt of the electrical signal from the electronic controller 24. In the first position of the electrically controlled proportional valve 86, the conduit 95 is in communication with the conduit 96 and in the second position thereof, the conduit 95 is blocked from communication with the conduit 96.

The latching shuttle valve 88 is a two position valve having opposed ends 100,102 and is movable between its first and second positions in response to a differential force being applied to its opposed ends 100,102. The one opposed end 100 of the latching shuttle valve 88 is connected to the hydraulically actuated clutch 47 by a conduit 104 and the conduit 65. The conduit 78 connects the other opposed end 102 thereof to the master latch valve mechanism 58. A spring 106 is located at the other opposed end 102 and the force therefrom urges the latching shuttle valve 88 towards its first position at which the conduit 96 is in communication with the reservoir 30. In the second position of the latching shuttle valve 88, the conduit 96 is blocked from communication with the reservoir 30.

Figure 3:
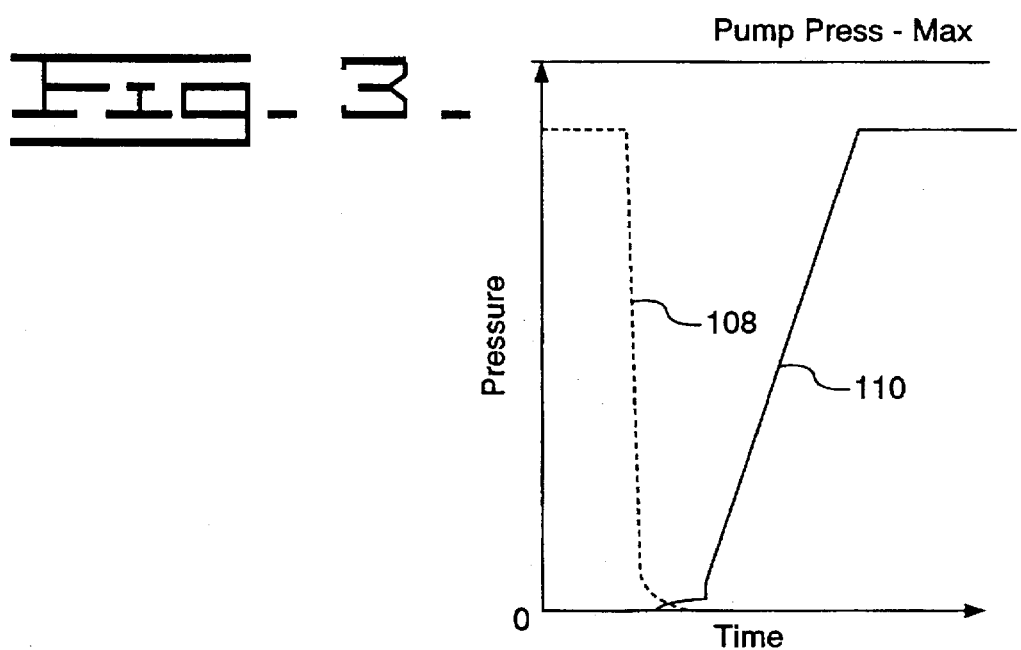
FIG. 3 is a graph illustrating a typical pressure trace of one hydraulically actuated clutch in a transmission being disengaged and another hydraulically actuated clutch being engaged.

Referring to FIG. 3, a typical pressure trace is illustrated depicting pressure verses time of one hydraulically actuated clutch being disengaged and another hydraulically actuated clutch being engaged. The one hydraulically actuated clutch being disengaged is represented by a dashed line 108 and the hydraulically actuated clutch being engaged is represented by a solid line 110. Note that the one hydraulically actuated clutch being disengaged is initially at its normally engaged pressure and is reduced once the shift is initiated. As illustrated, the normally engaged pressure is less than the maximum pressure attainable from the source of pressurized fluid 28. However, in some systems, the normal operating pressure in the actuated hydraulically actuated clutches is the same as the maximum pressure level in the source of pressurized fluid. Just prior to the pressure of the disengaging hydraulically actuated clutch reaching zero pressure, the pressure level of the engaging hydraulically actuated clutch is initiated. The pressure level of the engaging hydraulically actuated clutch is progressively increased until it reaches its normal, fully engaged pressure level as illustrated.

Figure 4:
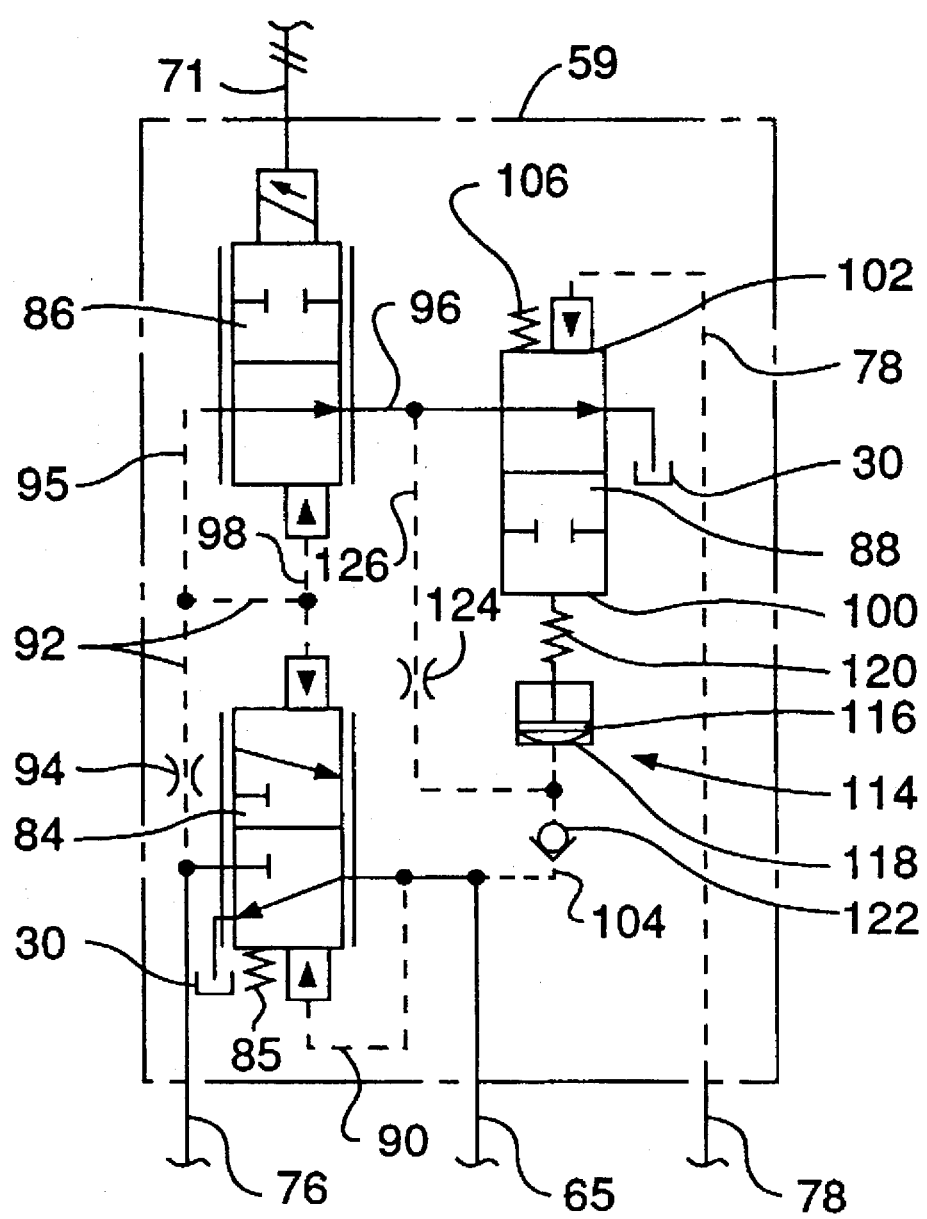
FIG. 4 is a schematic representation of another embodiment of the embodiment illustrated in FIG. 2.

Referring to FIG. 4, another embodiment of the respective ones of the plurality of electro-hydraulic valve mechanisms 56 is illustrated. Since many of the elements of FIG. 4 is the same as the elements of FIG. 2, like elements have like element numbers. In the embodiment of FIG. 4, the pilot conduit 104 is not connected directly to the one opposed end 100 of the latching shuttle valve 88. An accumulator mechanism 114 is disposed between the pilot conduit 104 and the one opposed end 100 of the latching shuttle valve 88. The accumulator mechanism 114 includes an accumulator piston 116 having a pressure chamber 118 on one end, a spring 120 is disposed between the other end of the accumulator piston 116 and the one opposed end 100, a one-way check valve 122 is disposed in the conduit 104 generally adjacent the pressure chamber 118, and a flow restrictor 124 is disposed in a conduit 126 that is connected between the pressure chamber 118 and the conduit 96 upstream of the latching shuttle valve 88.

Referring to FIG. 5, an alternate embodiment of the accumulator mechanism 114 is illustrated. Like elements have like element numbers. Altered elements have an "a" attached to the element number. In the arrangement of FIG. 5, the conduit 126 of FIG. 4 is deleted and the flow restrictor 124 is disposed in a conduit 126a that is connected between the pressure chamber 118 and the conduit 65.

It is recognized that various forms of the subject invention could be utilized without departing from the essence of the subject invention. For example, the plurality of hydraulically actuated clutches 46 could vary in number depending on the number of gear ranges desired in the system. Additionally, various pressure traces other than that illustrated in FIG. 3 could be provided in order to satisfy system requirements. Likewise, other system parameters could be sensed, such as an intermediate speed sensor in the transmission, and directed to the electronic controller 24 in order to provide more finite control of the transmission 12 with respect to other components of the machine system.

INDUSTRIAL APPLICABILITY

In the operation of the subject independent latching system 54 as generally illustrated in FIG. 1 and more specifically illustrated in FIGS. 2–3, the electronic controller 24 continuously monitors the rotational speed of the shafts 18,20, and 22 through the associated speed sensors 36,40 and 43. Once the machine is started, the electronic controller 24 directs an electrical signal to the master latch valve mechanism 58 moving it to its second position at which the source of pressurized fluid 28 is connected to the other opposed end 102 of the latching shuttle valve 88 forcing, in cooperation with the spring 106, the latching shuttle valve 88 to its first position. When it is desired to engage one or more of the plurality of hydraulically actuated clutches 46, the command input mechanism 32 is moved by the operator to one of its operative positions which directs an electrical signal through the electrical connection 34 to the electronic controller 24. The electronic controller 24 subsequently directs the appropriate output electrical signals through the respective electrical connections 71–75 to the respective electro-hydraulic valve mechanisms 59–63 to engage the appropriate ones of the plurality of hydraulically actuated clutches 46.

In the subject arrangement, it is necessary to engage two different hydraulically actuated clutches in order to place the transmission 12 in one of its plurality of speed ratios. With the five different hydraulically actuated clutches 47–51, six different speed ratios are obtained. It is recognized that other speed ratios can be obtained with the same number of hydraulically actuated clutches or with more or less number of hydraulically actuated clutches.

The following table illustrated an example of the speed ratios or gears obtainable in the subject system:

| GEAR | CLUTCHES ENGAGED |
| --- | --- |
| N | 5 |
| R | 3,5 |
| 1 | 1,5 |
| 2 | 1,4 |
| 3 | 1,3 |
| 4 | 1,2 |
| 5 | 2,3 |
| 6 | 2,4 |

If the input to the command input mechanism 32 requires that the transmission 12 be in its 1st gear, then the electronic controller 24 directs electrical signals to the first and fifth electro-hydraulic valve mechanisms 59,63 to engage the respective first and fifth hydraulically actuated clutches 47,51. The engagement of the respective first and fifth hydraulically actuated clutches 47,51 is proportionally controlled by the respective first and fifth electro-hydraulic valve mechanisms 59,63. The electrical signals from the electronic controller 24 act on the respective electrically controlled proportional valves 86 to move the respective electrically controlled proportional valves 86 towards their second positions. As the respective electrically controlled proportional valves 86 move towards their second positions, the respective proportional valves 84 moves towards their second positions thus interconnecting the source of pressurized fluid 28 with the respective first and fifth hydraulically actuated clutches 47,51. The rate of engagement is best illustrated in FIG. 3 and depicted by the solid line 110. Once both of the first and fifth hydraulically actuated clutches 47,51 are engaged, the transmission is in its first gear. The fluid flow being directed across the respective electrically controlled proportional valves 86 is directed to the reservoir 30 since the latching shuttle valve 88 is being maintained in its first position. Even though the pressurized fluid in the engaged hydraulically actuated clutches 47,51 is being directed to the one opposed end 100 of the respective latching shuttle valves 88, the force generated therefrom is not sufficient to overcome the force generated by the pressurized fluid from the source of pressurized fluid 28 acting on the other opposed end 102. Even if the pressures acting on both of the opposed ends 100,102 were the same, the force of the spring 106 would still maintain the latching shuttle valve 88 in its first position.

If it is desired to shift to another gear, such as fifth gear, the operator makes the desired selection to the command input mechanism 32. The electronic controller 24 subsequently directs the appropriate electrical signals to the appropriate second and third electro-hydraulic valve mechanisms 60,61 which act to engage the second and third hydraulically actuated clutches 48,49 thus placing the transmission 12 in its fifth gear. Simultaneously, the first and fifth hydraulically actuated clutches 47,51 have to be disengaged, as generally depicted in FIG. 3 just prior to and in overlapping relationship with the engagement of the second and third hydraulically actuated clutches 48,49.

The transmission can be placed in any of the gears noted in the table above by engaging the appropriate hydraulically actuated clutches as note in the table. It is recognized that the subject transmission 12 could be an automatically controlled transmission without departing from the essence of the subject invention.

In the event of an electrical malfunction in the electrical system with the transmission 12 being operated in one of its operative gears, it is desired to ensure that the transmission 12 remains in the engaged gear. In the subject arrangement, upon an electrical malfunction, the transmission 12 remains in the gear that it is in or going into at the time the electrical malfunction occurs. This is accomplished in the following manner. With no electrical energy, the master latch valve mechanism 58 moves to its first spring biased position which communicates the other opposed end 102 of each of the latching shuttle valves 88 to the reservoir 30. With the other opposed end 102 in communication with the reservoir 30, the force generated by the pressurized fluid in the actuated ones of the hydraulically actuated clutches 47–51 acting on the one opposed end 100 quickly moves the respective latching shuttle valves 88 to their second positions at which the fluid in the conduit 96 from the respective electrically controlled proportional valves 86 is blocked from the reservoir 30. With the fluid in the conduit 96 blocked from the reservoir 30, the pressure of the fluid in the pilot conduit 95 and simultaneously the pressure of the fluid in conduit 92 quickly increases. Consequently, the position of the proportional valves 84 being operated are moved to their second positions which fully actuates the hydraulically actuated clutches that were being used at the time the electrical malfunction occurred. The currently operated proportional valves 84 are moved to their second positions since full pressure from the source of pressurized fluid 28 is being directed to the end opposite the spring 85 and the pressure in the respective actuated hydraulically actuated clutches are never operating at a pressure above the normal operating pressure depicted in FIG. 3. However, in the event of an electrical malfunction, the hydraulically actuated clutch pressure increases to the maximum pressure of the source of pressurized fluid 28. Once the appropriate ones of the proportional valves 84 have been moved to their second positions and since the pressurized fluid in the pilot conduit 92 is blocked from the reservoir 30, the proportional valves 84 remain in their respective second positions until the machine is turned off or the electrical malfunction has been repaired and the system reset.

Referring to the operation of the embodiment of the electro-hydraulic valve mechanisms 59–63 of FIG. 2, the system functions the same during normal operation as that set forth above with respect to FIG. 2. The only difference in operation is in controlling movement of the respective latching shuttle valves 88. The pressure of the fluid in the respective actuated hydraulically actuated clutches is directed across the appropriated one-way check valves 122 to the pressure chamber 118 to act on the one end of the accumulator piston 116 moving it against the bias of the spring 120. The flow restrictor 124 acts to restrict the flow of fluid through the conduit 126 to ensure that the accumulator piston 116 quickly moves to load the spring 120. The force input from movement of the accumulator piston 116 is directed to the one opposed end 100 of the latching shuttle valve 88. In the event of an electrical malfunction, the flow restrictor 124 inhibits the flow thereacross from the pressure chamber 118 to ensure that the latching shuttle valve 88 reaches its second position. Once the latching shuttle valve 88 is in its second position, the pressure in the conduit 96 again increases and is directed across the flow restrictor 124 to the accumulator piston 116 to maintain the load on the spring 120. As long as the accumulator piston 116 has been moved at least a portion of the distance against the bias of the spring 120 and an electrical malfunction occurs, the force in the spring 120 is sufficient to move the latching shuttle valve 88 to its second position against the bias of the spring 106 to ensure that the respective operated proportional valves 84 are held in their second positions to maintain the respective hydraulically actuated clutches engaged.

In view of the foregoing, it is readily apparent that the independent latching system 54 herein is a simple and reliable arrangement to ensure that upon an electrical malfunction in the control system 10, the transmission 12 will remain in the same gear that it was in when the electrical malfunction occurred.

Other aspects, objects and advantages of the invention can be obtained from a study of the drawings, the disclosure and the appended claims.

I claim:

1. An independent latching system adapted for use in a control system for a transmission having a plurality of hydraulically actuated clutches, the control system including a source of pressurized fluid connected to a reservoir and an electronic controller connected to a source of electrical energy and operative to receive signals from various system parameters and to direct control signals therefrom, the electronic controller is operative in response to a command input mechanism to selectively control engagement of respective ones of the hydraulically actuated clutches in the transmission, the independent latching system comprises:

a plurality of electro-hydraulic valve mechanism connected to the electronic controller and to respective ones of the hydraulically actuated clutches and each being operative in response to receipt of an electrical signal from the electronic controller to proportionally control engagement of the respective hydraulically actuated clutches, each of the electro-hydraulic valve mechanisms includes a proportional valve connected between the source of pressurized fluid and the respective hydraulically actuated clutch, an electrically controlled proportional valve operatively connected to the electronic controller and the proportional valve, and a latching shuttle valve having opposed ends with one of the opposed ends connected to the respective hydraulically actuated clutch and being disposed between the electrically controlled proportional valve and the reservoir, the latching shuttle valve being movable in response to a force differential between its opposed ends; and a master latch valve mechanism connected between the source of pressurized fluid and the other opposed end of the latching shuttle valve.

2. The independent latching system of claim 1 wherein the latching shuttle valve is a two position valve movable between a first position at which the electrically controlled proportional valve is in communication with the reservoir and a second position at which the electrically controlled proportional valve is blocked from communication with the reservoir.

3. The independent latching system of claim 2 wherein the master latch valve mechanism is a two position valve that is spring biased to a first position at which the other opposed end of the latching shuttle valve is in communication with the reservoir and a second position at which the other opposed end of the latching shuttle valve is blocked from communication with the reservoir and in communication with the source of pressurized fluid.

4. The independent latching system of claim 3 wherein a spring force urges the latching shuttle valve towards its first position.

5. The independent latching system of claim 4 wherein the two position master latch valve is movable to its second position in response to receipt of an electrical signal from the electronic controller.

6. The independent latching system of claim 5 including an accumulator mechanism disposed between the one opposed end of the latching shuttle valve and the respective hydraulically actuated clutch and located adjacent the one opposed end thereof.

7. The independent latching system of claim 6 wherein the accumulator mechanism includes an accumulator piston having a pressure chamber at one end thereof connected to the respective hydraulically actuated clutch, a spring disposed between the other end thereof and the one opposed end of the latching shuttle valve, a one-way check valve disposed between the pressure chamber of the accumulator and the respective hydraulically actuated clutch, and a flow restrictor connected between the pressure chamber of the accumulator piston and a point upstream of the latching shuttle valve.

8. The independent latching system of claim 6 wherein the accumulator mechanism includes an accumulator piston having a pressure chamber at one end thereof connected to the respective hydraulically actuated clutch, a spring disposed between the other end thereof and the one opposed end of the latching shuttle valve, a one-way check valve disposed between the pressure chamber of the accumulator and the respective hydraulically actuated clutch, and a flow restrictor connected between the pressure chamber of the accumulator piston and the respective hydraulically actuated clutch.

* * * * *